UNITED STATES PATENT OFFICE.

FRANZ SCHOLL AND WILLY TROPP, OF HÖCHST-ON-THE-MAIN, GERMANY, ASSIGNORS TO FARBWERKE VORM. MEISTER LUCIUS & BRUNING, OF HÖCHST-ON-THE-MAIN, GERMANY, A CORPORATION OF GERMANY.

BROWN AZO DYESTUFF AND PROCESS OF MAKING SAME.

1,043,873.     Specification of Letters Patent.     Patented Nov. 12, 1912.

No Drawing.     Application filed October 6, 1911. Serial No. 653,288.

*To all whom it may concern:*

Be it known that we, FRANZ SCHOLL, Ph. D., chemist, and WILLY TROPP, Ph. D., chemist, citizens of the Empire of Germany, both residing at Höchst-on-the-Main, Germany, have invented certain new and useful Improvements in Brown Azo Dyestuff and Processes of Making Same, of which the following is a specification.

We have found that fast brown acid dyestuffs, dyeing very evenly, are produced by causing the diazo compounds of m-amino-γ-arylaziminobenzenesulfonic acids to act upon the 2-arylamino-8-oxynaphthalene-6-sulfonic acids. The azo-dyestuffs thus obtained have the constitution:

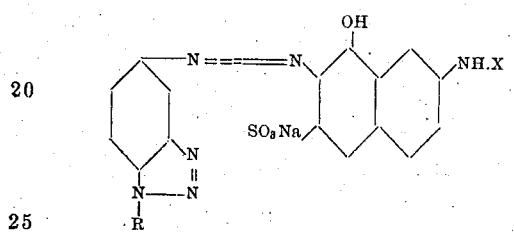

wherein "R" stands for the residue of an aromatic sulfonic acid, and "X" for an aryl residue. These dyestuffs are brown powders, readily soluble in water to a brown solution which scarcely changes on addition of ammonia, and on addition of a mineral acid assumes a slightly greenish color. They dissolve in concentrated sulfuric acid with a pure red color, but are insoluble in alcohol, ether and ligroin. The dyestuffs dye wool in an acid bath reddish-brown to brown tints. The m-amino-γ-arylaziminobenzenesulfonic acids are obtained from the partly-reduced products resulting from the reaction of 2.4-dinitrochlorobenzene upon aromatic aminosulfonic acids with the aid of nitrous acid and subsequent reduction.

The following examples illustrate our invention:

1. 31 kilos of the sodium salt of the m-amino-γ-m-sulfophenylaziminobenzene are dissolved with 7 kilos of sodium nitrite in about 600 liters of water and this solution is introduced at 30–40° C. into 30 kilos of hydrochloric acid of 19° Bé. which has been diluted with water so as to give about 150 liters. This mixture is stirred for some time. When the diazotation is completed, the diazo compound is introduced into a solution of 34 kilos of 2-p-tolylamino-8-oxynaphthalene-6-sulfonic acid and 25 kilos of calcined soda in about 600 liters of water. The brown dyestuff solution, which immediately forms, is gently heated for some further hours, and after addition of common salt stirred for a good time. The separated product is then filtered off and dried. The constitutional formula of this dyestuff is as follows:

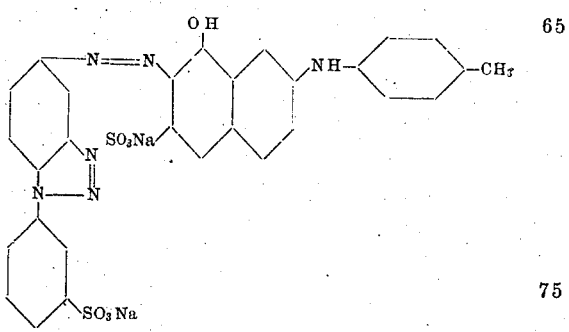

It is a brown powder, readily soluble in water to a brown solution which on addition of a mineral acid becomes slightly greenish, and on addition of caustic soda lye slightly reddish, scarcely changing by the addition of ammonia. In concentrated sulfuric acid it dissolves with a fuchsine-red color and is insoluble in alcohol, ether and ligroin. It dyes wool in an acid bath brown tints.

2. 34 kilos of the sodium salt of the m-amino-γ-5-sulfo-1-naphthylaziminobenzene are dissolved in water, mixed with 7 kilos of sodium nitrite and run at 35°–40° C. into 30 kilos of hydrochloric acid of 19° Bé. which has been diluted with water so as to give about 200 liters. After stirring the mixture for several hours the diazotation is complete and the diazo compound, which is difficultly soluble, separates in crystals. This compound is then introduced into a solution of 34 kilos of sodium salt of 2-phenylamino-8-oxynaphthalene-6-sulfonic acid and 25 kilos of calcined soda in about 600 liters of water, whereupon the dyestuff immediately separates in the form of brown flakes. After some hours the mixture is heated to about 70° and on cooling filtered off and dried. The dyestuff thus obtained has the constitutional formula:

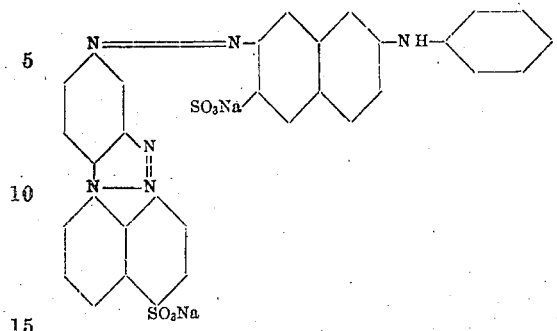

It is a brown powder, readily soluble in water to a brown solution, insoluble in alcohol, ether and ligroin. It dyes wool in an acid bath reddish-brown tints.

Having now described our invention, what we claim is:

1. As new articles of manufacture, the dyestuffs of the constitution:

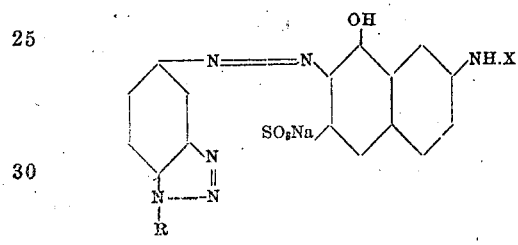

wherein "R" stands for an aromatic sulfonic acid and "X" for an aryl residue; being a brown powder, soluble in water with a brown color, scarcely changing on addition of ammonia, turning slightly greenish on addition of a mineral acid, dissolving in concentrated sulfuric acid with a pure red color, being insoluble in alcohol, ether and ligroin, and dyeing wool reddish-brown to brown tints.

2. As a new article of manufacture, the dyestuff of the constitution:

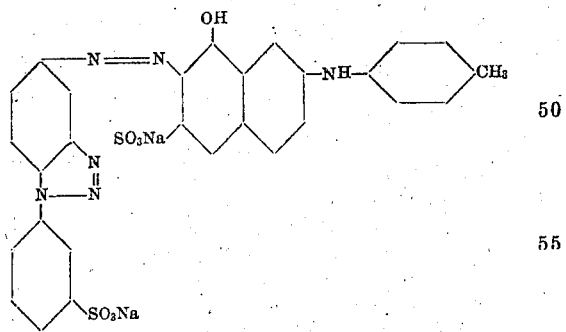

being a brown powder, readily soluble in water with a brown color, turning slightly greenish on addition of a mineral acid and on addition of caustic soda lye slightly reddish, scarcely changing on addition of ammonia, dissolving in concentrated sulfuric acid with a fuchsine-red color, insoluble in alcohol, ether and ligroin and dyeing wool brown tints.

3. The process of manufacturing brown mono-azo dyestuffs, which consists in causing the diazo compounds of the m-amino-γ-arylaziminobenzolsulfonic acids to act upon aryl-2-amino-8-oxynaphthalene-6-sulfonic acid.

In testimony whereof, we affix our signatures in presence of two witnesses.

FRANZ SCHOLL.
WILLY TROPP.

Witnesses:
 JEAN GRUND,
 CARL GRUND.